April 28, 1936.  E. LAVERDISSE  2,038,662
APPARATUS FOR TRANSPORTING SHEETS OF GLASS
Filed June 25, 1934
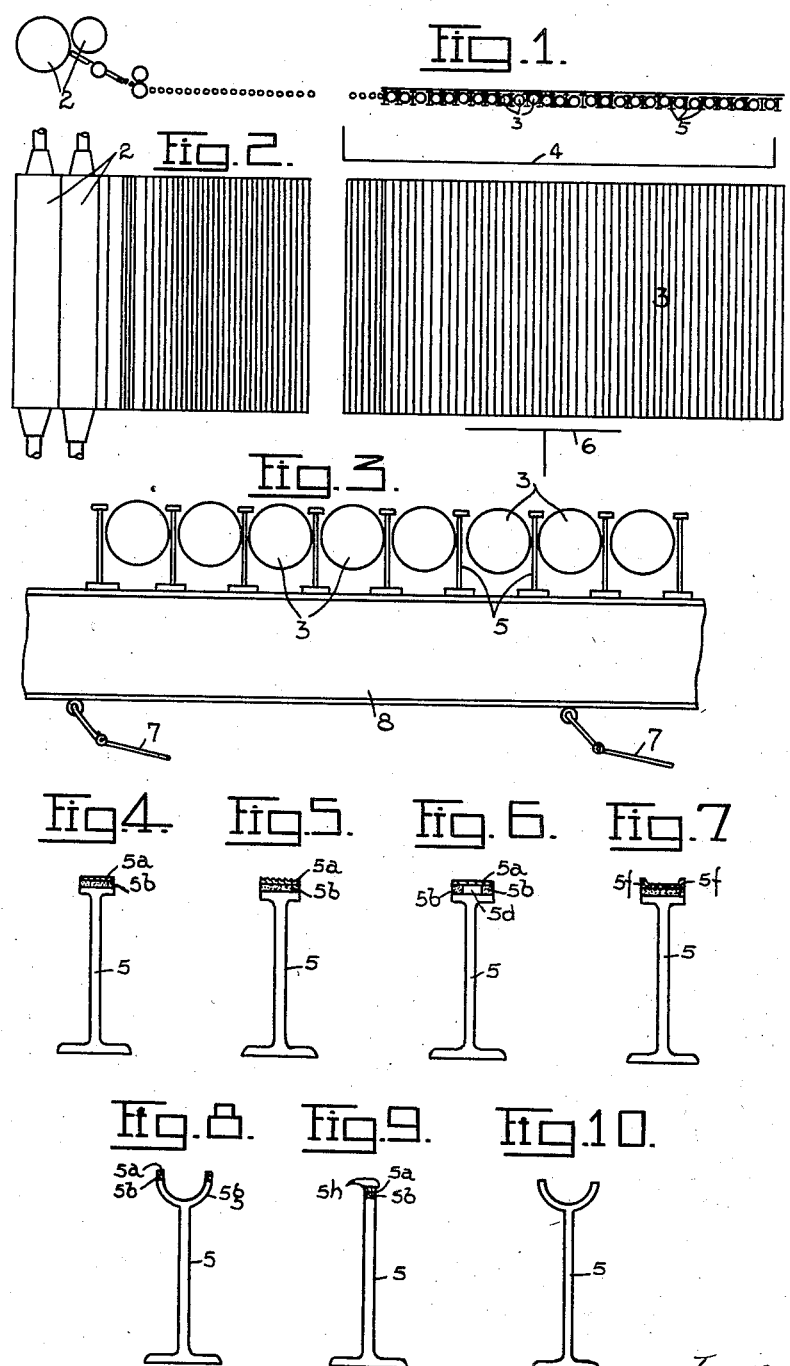

Patented Apr. 28, 1936

2,038,662

UNITED STATES PATENT OFFICE 2,038,662

APPARATUS FOR TRANSPORTING SHEETS OF GLASS

Edmond Laverdisse, Auvelais, Belgium, assignor to Les Glaceries de la Sambre, Société Anonyme, Auvelais, Belgium Application June 25, 1934, Serial No. 732,375
In Belgium October 2, 1933

12 Claims. (Cl. 49—3)

The present invention relates to an apparatus for transporting sheets of glass from the rolling machine into the annealing oven and more particularly has reference to supports positioned between the rollers onto which the sheet of glass is moved on leaving the rolling machine, until it is in front of the annealing oven, which supports are capable of vertical movement to push the sheets of glass away from the rollers while being slid into the oven.

It is known that when these supports, which are generally metallic and therefore good conductors of heat, are brought into contact with the sheets of glass, cracks are formed in the sheets above the supports due to local cooling. To obviate such cracks, it has been proposed to reduce the area of contact between the sheets and the supports by corrugating the latter. It has also been proposed to make either the entire supports, or solely their upper portion, of a material which is a poor conductor of heat.

Experience shows that cracks continue to be produced in the sheets in spite of these precautions.

The present invention seeks to obviate this inconvenience.

According to the invention, the upper part of the supports is formed of a thin layer of a material which is a good conductor of heat, which thin layer is carried by a layer of material which is a poor conductor of heat.

Preferably, the thin layer in question is made of a material, the product of the specific heat and the density of which is relatively small.

The good results which have been obtained during experiments can be explained as follows:

The thin upper layer of material which is a good conductor of heat receives heat by radiation from the sheet of glass as it progresses along the rollers. On account of the good conductivity of the thin coat, the absorbed heat is quickly spread over the whole of the layer. This heat cannot be transmitted quickly to the rest of the support on account of the layer of material which is a poor conductor of heat. Therefore, the thin upper layer rapidly assumes a temperature in the neighbourhood of that of the sheet of glass. This temperature is more rapidly achieved, the lower the quantity of heat required to heat the same to that temperature, i. e., the lower the product of the specific heat and the density of the material.

Preferably a matt-surface is given to the thin layer to facilitate absorption of the heat radiated by the sheet of glass.

For the same reason it is preferable to use a material of a dull colour.

In order to obviate the formation of zones of cracking which intersect, it is further sought, according to the invention, to separate the surfaces of contact between the supports and the sheets of glass as much as possible.

According to one method, each support has only two surfaces of contact with the sheets of glass and those surfaces are separated as much as possible. According to another method, the ends of the supports are of small width.

The idea of the separation of the surfaces of contact of the support with the sheet of glass may also be applied with advantage to supports which are not provided with a thin layer of material such as that mentioned. The invention is, therefore, not limited to this latter case.

Further particulars and details of the invention will appear during the description of the accompanying diagrammatic drawing which illustrates some embodiments of the invention solely as examples and in which:

Fig. 1 is an elevation of the apparatus according to the invention;

Fig. 2 is a plan of same;

Fig. 3 is an elevation on a larger scale of a part of this apparatus;

Fig. 4 represents, on a still larger scale, one of the supports which move vertically.

Figs. 5–10 represent variations of the support according to the invention.

In Figs. 1 and 2 there is diagrammatically shown a rolling machine for sheets of glass comprising two rollers 2 from which a sheet of glass is transported by the rollers 3 to an annealing oven 4 situated laterally in relation to the series of rollers. Between the rollers 3 situated in front of the oven 4 are the supports 5 which have their upper surfaces some small distance below the sheet of glass as it advances along the rollers. When a sheet of glass arrives opposite the annealing oven 4 the supports 5 are raised so as to push the sheet away from the rollers, and the sheet is then pushed longitudinally of said supports into the oven 4 by means of the diagrammatically illustrated tools 6. The raising of all the supports 5 may be effected simultaneously by tipping the levers 7 supporting the beams 8 on which the supports are mounted.

The upper part of each support which comes into contact with the sheet of glass is formed of a thin layer 5a of material which is a good conductor of heat (Fig. 4). This thin layer 5a rests on a layer 5b of material which is a poor conductor of heat. The layer 5a is made preferably of a material which requires but little heat to increase its temperature. It is, therefore, a material for which the product of the specific heat by the density is small. On account of its thinness, the layer 5a can thus rapidly attain a temperature approaching that of the sheet of glass supported above it on the rollers. The heat radiated by the sheet of glass and that which is absorbed by the thin layer cannot easily be conducted to the rest of the support 5 on account of the presence of the layer 5b of material which is a poor conductor of heat.

In order to easily absorb the heat radiated by the sheet of glass, the thin upper layer 5a should have preferably a matt-surface.

For the same reason, other conditions being equal, a material having a dull colour is chosen preferably for the layer 5a.

The thin layer 5a can naturally present an upper surface which is not plane and can, for example, be corrugated as shown in Fig. 5.

The layer 5b of poor heat-conducting material may be comprised partly by the dead air space 5d (Fig. 6) whose two lateral walls are of poor heat-conducting material. If desired, the cavity 5d may be evacuated.

Preferably the surfaces of contact between the thin layer 5a and the sheet of glass are as far apart as possible so that any small cracks formed shall not intersect and thereby increase the depth of the damaged zone.

These surfaces of contact are formed, for example, by the extremities of the arms 5f (Fig. 7) of a thin channel member which forms the said thin layer. This channel member has a web the width of which is approximately the same as the width of the head of an ordinary support.

The head of a support according to the invention can also be made with advantage in the form of a fork by utilizing a semi-tubular member 5g (Fig. 8). The two longitudinally extending edges of this semi-tubular member are covered with a layer 5b of poor heat-conducting material which, in turn, is covered by a thin layer 5a of material which is a good conductor of heat.

It is also proposed according to the invention, to make the head of the support (Fig. 9) very narrow. In this way, the lateral edges 5h of the thin layer 5a are close together so that the contact surface between the head of a support and the sheet of glass approaches a line contact. In this case, the distance between the possible zones of cracking becomes practically equal to the distance between the supports.

The large separation of the surfaces of contact between a support and a sheet of glass can be applied equally with advantage to supports which are not provided with a thin layer of good heat-conducting material separated from the rest of the support by a layer of poor heat-conducting material. A support of this kind is shown, for example, in Fig. 10.

Whatever type of support is adopted, it can naturally be divided along its length to diminish the area of contact of the supports with the sheets of glass.

As material to be employed for the thin layer 5a, the following may be used, for example: steel, the specific heat of which is 0.1185 and density about 7.80; copper, specific heat 0.0952 and density about 8.57; brass, specific heat 0.0939 and density about 8.55; zinc with specific heat 0.0956 and density about 7.

Aluminium, with a specific heat of 0.2181 and density about 2.56 may be no more advantageous than copper on account of its bright colour. On the other hand, lead, with a specific heat of 0.0314 and a density about 11.40 is not very suitable on account of its low mechanical resistance.

It goes without saying that the material used for the thin layer 5a must not melt at the temperature to which it may be exposed on contact with the sheet of glass.

It is evident that the invention is not exclusively limited to the embodiments given and that many modifications may be made in the form, disposition, and constitution of the elements used in the achievement of the invention without going beyond the scope of the same.

What I claim is:

1. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin layer of good heat-conducting material on the upper part of each support and a layer of material which is a poor conductor of heat positioned between said thin layer and the support.

2. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin layer of a material for which the product of the specific heat by the density is relatively small on the upper part of each support, and a layer of material which is a poor conductor of heat positioned between said thin layer and the support.

3. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin layer of good heat-conducting material on the upper part of each support and a layer of material which is a poor conductor of heat positioned between said thin layer and the support, the said thin layer of good heat-conducting material having a matt upper surface.

4. Apparatus for transporting sheets of glass from a rolling machine to an annealing oven, comprising between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin layer of good heat-conducting material on the upper part of each support and a layer of material which is a poor conductor of heat positioned between said thin layer and the support, the material constituting the said thin layer being of a dull colour.

5. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, each support having widely separated surfaces of contact with the sheet, means for laterally pushing the sheet in the oven when it is on the supports, a thin layer of good heat-conducting material on the upper part of each support, and a layer of material which is a poor conductor of heat for carrying the said thin layer.

6. Apparatus for transporting sheets of glass from a rolling machine to an annealing oven, comprising between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin channel member formed of good heat-conducting material and having two flanges spaced at a considerable distance from each other on each support, and a layer of poor heat-conducting material positioned between said thin channel member and the support.

7. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, the upper part of each of the said supports being in the form of a fork in cross-section, a layer of poor heat-conducting material on the extremities of the branches of said fork, and a thin layer of good heat-conducting material on each of said layers of poor heat-conducting material.

8. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a semi-tubular member on the upper part of each of the said supports and having its longitudinally projecting edges extending upwardly, a layer of poor heat-conducting material on the said edges, and a thin layer of good heat-conducting material on each of said layers of poor heat-conducting material.

9. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports with a head of small width between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, a thin layer of good heat-conducting material on the upper part of said supports and a layer of material which is a poor conductor of heat positioned between said thin layer and the support.

10. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, and a channel member on the upper part of said supports, said channel member having two widely spaced flanges.

11. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, and a member of fork-like cross-section on the upper part of each of the supports.

12. Apparatus for transporting sheets of glass from a rolling machine to an annealing oven, comprising, between the rolling machine and the annealing oven, a series of rollers on which the sheet coming from the rolling machine is transported, said oven being situated laterally relatively to the said series of rollers, supports between the rollers which are in front of the annealing oven, said supports having their upper surfaces at a small distance below the upper level of the rollers during the advancement of the sheet of glass along the rollers, means for raising the said supports above the upper level of the rollers in front of the oven when a sheet is in front of the oven, means for laterally pushing the sheet in the oven when it is on the supports, and a semi-tubular member on the upper part of each of the said supports, said semi-tubular member having its longitudinally extending edges projecting upwardly.

EDMOND LAVERDISSE.